Nov. 21, 1939.  C. A. SABBAH  2,180,998
ELECTRIC VALVE CONVERTING SYSTEM
Filed April 7, 1937   2 Sheets-Sheet 2
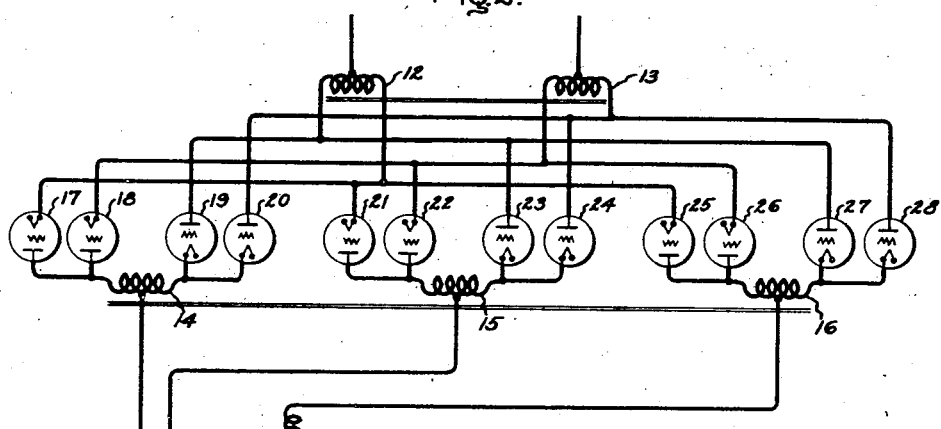
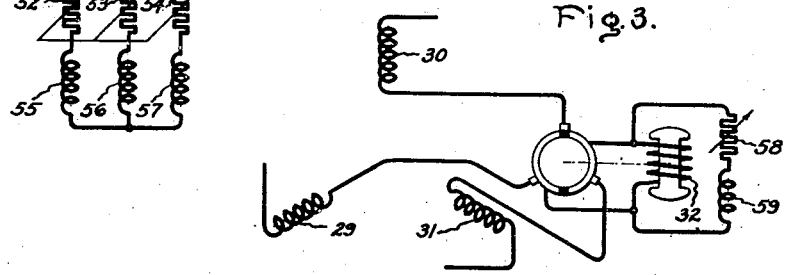
Inventor:
Camil A. Sabbah, Deceased,
by William A. Dodge, Administrator,
by Harry E. Dunham
Attorney.

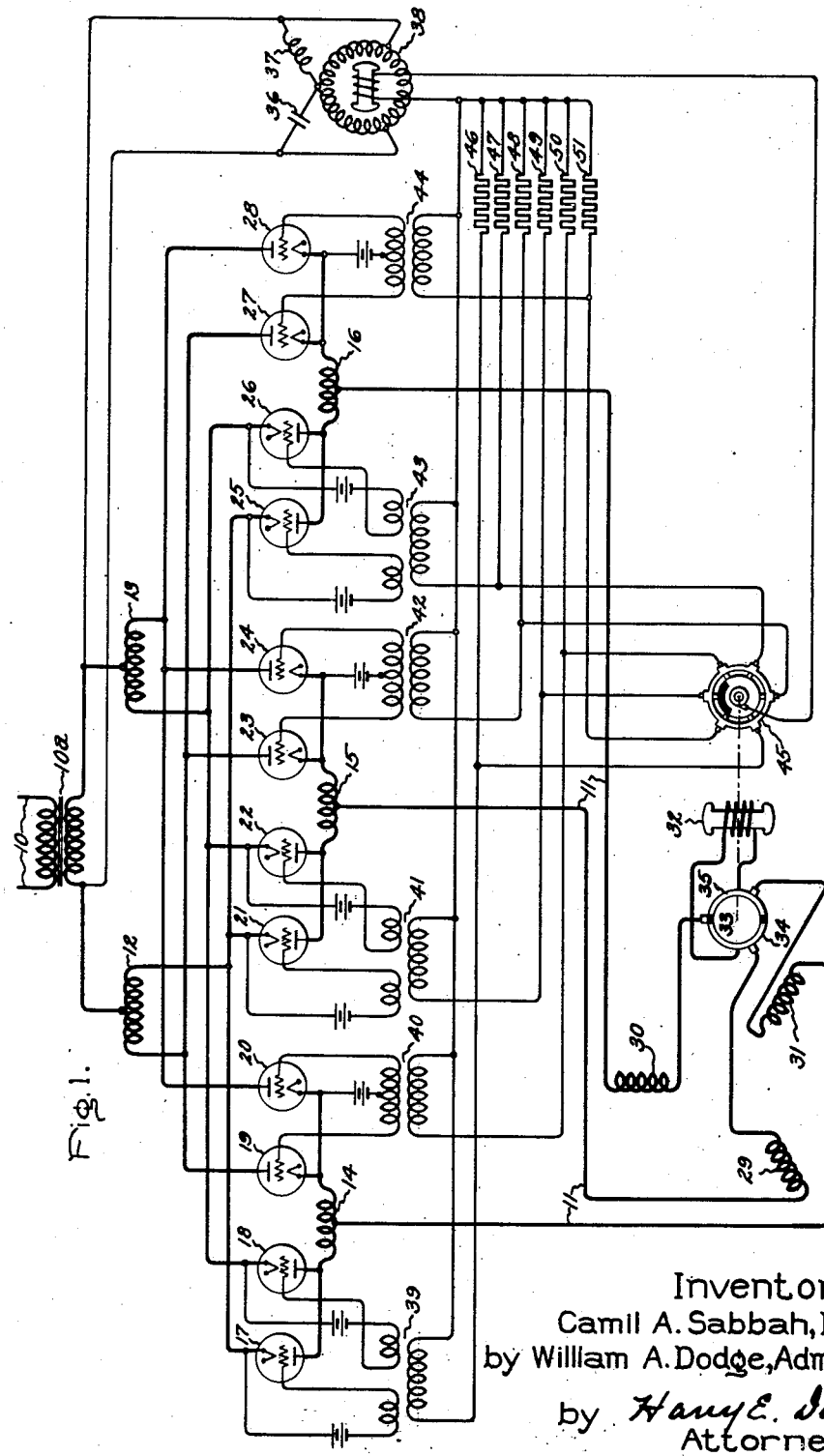

Patented Nov. 21, 1939

2,180,998

UNITED STATES PATENT OFFICE 2,180,998

ELECTRIC VALVE CONVERTING SYSTEM

Camil A. Sabbah, deceased, late of Schenectady, N. Y., by William A. Dodge, administrator, Schenectady, N. Y., assignor to General Electric Company, a corporation of New York Application April 7, 1937, Serial No. 135,476

14 Claims. (Cl. 172—274)

This invention relates to electric valve converting systems and more particularly to such systems arranged to transmit energy between alternating current circuits of different frequencies.

Heretofore there have been proposed numerous systems for transmitting energy from an alternating current source to an alternating current load circuit of a different frequency as, for instance, an alternating current motor which it is desired to operate in accordance with a particular characteristic. Certain of these arrangements in the prior art, however, in the instance of synchronous machines, do not provide a simple means of supplying unidirectional current to the field winding. Some of the arrangements in the prior art utilized two sets of armature windings with a field winding connected between the neutrals thereof, whereas others utilized a connection from the neutral point of the armature windings to the neutral point of the transformer of the electric valve converting system supplying energy thereto. Such arrangements, however, have certain disadvantages in that the amount of equipment required is greater than what is thought to be desirable under certain conditions.

It is, therefore, an object of this invention to provide an improved electric valve converting system which will overcome the above mentioned disadvantages of the arrangements of the prior art and which will be simple and reliable in operation.

It is another object of this invention to provide means for obtaining the characteristics of the direct current series motor with an alternating current machine energized from a source of variable frequency alternating current.

It is a further object of this invention to provide means for controlling the field current of an alternating current machine where this field is supplied with current obtained from a source of variable frequency alternating current.

It is a still further object of this invention to provide an improved electric valve converting system for transmitting energy from a single phase source of current of constant frequency to a polyphase circuit of variable frequency.

For a better understanding of this invention, together with further objects and advantages thereof, reference is had to the following description taken in connection with the accompanying drawings in which Fig. 1 is a preferred embodiment of the invention, and Figs. 2 and 3 are modifications thereof.

Referring to the drawings, there is illustrated an electric valve converting system for transferring energy from an alternating current source 10 to a polyphase alternating current circuit 11. This arrangement utilizes a pair of inductive windings or inductors 12 and 13, each of which is connected at an intermediate point thereon to be energized from the alternating current source 10. If desired a transformer 10a may be interposed between the inductors and the alternating current source 10. A plurality of inductive windings 14, 15 and 16 are each connected at a neutral point thereon to a different one of the conductors of the alternating current circuit 11. A plurality of electric discharge devices, or valves, 17 to 28, inclusive, are arranged to connect each of the terminals of the inductive windings 14 to 16 with the inductive windings 12 and 13. Thus the valves 17, 21 and 25, have their anodes each connected to one terminal of the inductors 14, 15 and 16, respectively, and their cathodes are connected to the right-hand terminal of the inductive winding 12. The anodes of the valves 18, 22 and 26 are connected respectively to the same terminals of the inductive windings 14 to 16 and their cathodes are similarly connected to the left-hand terminal of the inductive winding or inductor 13. The anodes of the valves 19, 23 and 27 are all connected to the left-hand terminal of inductor 12, whereas their cathodes are connected respectively to the right-hand terminal of the inductors 14, 15 and 16. The anodes of the valves 20, 24 and 28 are all connected to the right-hand terminal of the inductor 13, whereas their cathodes are each connected respectively to the right-hand terminals of the inductors 14, 15 and 16. Thus each terminal of the inductors 14, 15 and 16 is interconnected by means of two electric valves with a terminal of each of the inductors 12 and 13. It is, of course, to be understood that while each of the electric valves 17 to 28 has been shown as being provided with an anode, a cathode and a control grid, that any of the numerous types of electric valves well known in the art may be utilized, although it is preferable to utilize valves containing an ionizable medium and which are provided with a starting or control electrode.

The conductors of the alternating current circuit 11 are each connected to a different one of the armature phase windings 29 to 31 of an alternating current motor of the synchronous type which has a rotating field 32. In order to provide a unidirectional flow of current through the field winding 32, a switching device 33 mounted on the shaft of the motor is so arranged as to connect the field winding 32 between different armature phase windings so as to provide this desired current relationship. This switching device 33 is shown as comprising a commutator having two segments 34 and 35, each of which is connected to a different terminal of the field winding 32. A plurality of brushes, each of which is connected to a different terminal of the armature phase windings 29 to 31, are arranged at equidistant intervals around the periphery of the commutator. This switching device is so arranged that it does not operate to commutate or interrupt current between the armature windings, but merely provides the proper connection in accordance with the sequence of the conductivities of the various valves supplying current to the armature phase windings.

In order to control the amount and the frequency of the energy transmitted to the alternating current motor through the circuit 11, the control electrodes of the various valves 17 to 28 are each provided with a control circuit which may include a suitable source of biasing voltage and a transformer winding which is energized at predetermined intervals with alternating current of the proper phase relationship and of the same frequency as the alternating current circuit 10. This arrangement includes a suitable phase splitting circuit comprising a pair of dissimilar impedance elements 36 and 37 connected between the circuit 10, and a phase shifter 38. One terminal of the phase shifter 38 is connected directly to one terminal of the grid or control circuit transformers 39 to 44, inclusive, each of which supplies energy to the grid circuits of two of the valves 17 to 28. The remaining terminals of the transformers 39 to 44, inclusive, and the remaining terminal of the phase shifting device 38 are connected together at proper intervals by means of the distributor 45 which is mounted on the shaft of the alternating current motor. These same terminals of the transformer windings 39 to 44 are connected through their respective resistors 46 to 51 to the other terminal of the phase shifting device 38. The primary windings of the grid transformers 39 to 44, inclusive, are, therefore, energized with potentials appearing across these resistors 46 to 51 respectively. These resistors are selectively energized by the distributor 45 which is provided with a brush for each of the transformers 39 to 44 and a commutator segment which is connected to one side of the phase shifting device 38. The feature of energizing synchronous motors as described above and distributor arrangements for energizing the synchronous dynamo-electric machines are explained in detail and broadly claimed in Patent No. 1,937,370—C. H. Willis—granted November 28, 1933, and Patents Nos. 1,993,581—Alexanderson—March 5, 1935, and 1,937,377—Alexanderson—November 28, 1933, all assigned to same assignee as the present application.

If it is assumed that the right-hand conductor of the alternating current circuit 10 is positive, it will be apparent that a positive potential is impressed at the mid-point of the inductive winding 13. Thus one of the valves 20, 24, or 28 must be rendered conductive. Likewise, the mid-point of the inductive winding or inductor 12 has a negative potential and hence one of the valves 17, 21, or 25 must also be conductive. Thus if assumed that electric valve 28 and valve 17 are each conductive, it will be apparent that current will flow from the right-hand terminal of the alternating current circuit 10, through inductive winding 13, a portion of the inductive winding 16, the armature phase winding 30, through the field winding 32, the armature phase winding 31, a portion of the inductive winding 14, the valve 17, through a portion of the inductive winding 12 to the left-hand terminal of the alternating current circuit 10. It is apparent that at a later time the flow of current would be from the positive terminal of the alternating current circuit 10, through a portion of the inductive winding 13, through electric valve 24, a portion of the inductive winding 15, the phase winding 29, field winding 32, the armature phase winding 31, a portion of the inductive winding 14, the valve 17, a portion of the inductive winding 13, to the left-hand terminal of the alternating current circuit 10. When, however, the right-hand terminal of the alternating current circuit 10 is negative, the flow of current will be from the positive terminal or left-hand terminal of the alternating current circuit 10, through a portion of the inductive winding 12, through one of the valves 19, 23 or 26, through at least one of the armature phase windings 29, 30, through the field winding 31, and back through another of the phase windings 29, 30 or 31, through one of the valves 18, 22 or 26, to the left-hand terminal of the inductive winding 13, and to the right-hand terminal of the alternating current circuit 10. It is believed that the remainder of the operation of this system will be apparent to those skilled in the art and hence it is apparent that the flow of current through the field winding 32 is always in the same direction because of the connections made by the commutator segments 34 and 35 to the various brushes which are connected to the terminals of the phase windings 29 to 31. Thus while the physical form of the motor is that of a synchronous alternating current motor, the torque-speed characteristics of the motor are similar to the series type of direct current motor.

The arrangement shown in Fig. 2 illustrates how the inductive windings 12 and 13 may be mounted upon the same magnetic core structure. Similarly, the inductive windings 14 to 16 may be mounted upon a three legged magnetic core structure. The electric valve converting system shown between the alternating current circuit 10 and the alternating current circuit 11 is identical to that shown in Fig. 1. In order to provide an additional control means whereby it is possible to obtain certain desired torque-speed characteristics of the motor, a plurality of adjustable impedances arranged in star relation are connected between those terminals of the armature phase windings 29 to 31 which are connected to the brushes contacting the commutator of the switching device 33. Each of these adjustable impedances comprises one of the resistors 52 to 54 connected in series with one of the inductors 55 to 57. The adjustment of the resistor operates to change the amount of the flow of energy through the field winding 32 and the inductors operate to prevent an effective short circuit of the field winding due to reduced current flow therethrough. The loss of the inductive effect of the field winding 32 would be such as to reduce the normal smoothing effect produced by this inductance. By adjusting the various resistors 52 to 54 simultaneously it is possible to by-pass any desired amount of energy which would normally flow through the field winding 32, thereby changing the torque-speed characteristics of the alternating current machine. This change in the characteristics of the machine would be similar to the change obtained in a direct current series machine which includes a resistor in the field circuit of a motor.

The arrangement disclosed in Fig. 3 shows another method of providing a control for obtaining the desired change in the torque-speed characteristics of the motor. In this instance, an adjustable resistor 58 and an inductor 59 are connected in series relation in a circuit which is connected in parallel with the field winding 32 of the motor. Adjustment of the resistor 58 will by-pass a certain amount of energy through this circuit including the reactor 59 thereby changing the torque-speed characteristics of the alternating current machine.

While the arrangement illustrated shows the use of a switching means such as 33, it will be apparent to those skilled in the art that any other arrangement which would provide unidirectional flow of current through the field winding 32 may be employed. Such an arrangement, for instance, may comprise a plurality of rectifiers preferably of the copper oxide type connected across the field winding 32. A separate rectifier may be provided for each of the phase windings 29 to 31 and these windings are connected to the mid-points of the rectifiers so that a unidirectional flow of current is obtained through the field winding.

While this invention has been shown and described in connection with certain embodiments it will, of course, be understood that it is not to be limited thereto, since it is apparent that the principles herein disclosed are susceptible of numerous other applications, and modifications may be made in the circuit arrangements and in the instrumentalities employed without departing from the spirit and scope of this invention as set forth in the appended claims.

What is claimed as new and desired to be secured by Letters Patent of the United States, is:

1. An electric valve frequency changing system comprising an alternating current supply circuit, a polyphase alternating current load circuit, an inductive winding for each conductor of each of said circuits, each inductive winding being connected at an intermediate point thereon to a different conductor of its associated circuit, a plurality of controlled electric valves interconnecting the terminals of the inductive windings of said circuits, and means for controlling the conductivities of said valves.

2. An electric valve converting system comprising a single source of single phase alternating current, a pair of inductive windings each being connected at an intermediate point thereon to said current source, a polyphase alternating current load circuit, an inductive winding for each conductor of said polyphase circuit, said conductors each being connected to an intermediate point on a different one of said latter inductive winding, a plurality of electric valves interconnecting each terminal of said polyphase circuit inductive windings with said pair of inductive windings, and means for controlling the conductivities of said valves.

3. The combination comprising a source of alternating current variable in frequency, an alternating current dynamo-electric machine connected thereto, said machine being provided with a single group of armature phase windings and a field winding, means for conducting alternating current impulses from one of said armature windings through said field winding to another of said armature windings in such manner as to provide a unidirectional flow of current through said field winding, and means operated in response to the speed of said motor for determining the frequency of the alternating current supplied thereto.

4. The combination comprising an electric valve frequency changing system connected to an alternating current dynamo-electric machine provided with a plurality of armature phase windings and a field winding, means connected to said machine for controlling the frequency at which said electric valve frequency changing system operates, and switching means interconnecting said field winding and said armature phase windings, said switching means comprising a commutator provided with two segments, each segment being connected to one terminal of said field winding, and a plurality of brushes arranged at equal distances around the periphery of said commutator, each of said brushes being connected to a different one of said armature phase windings.

5. The combination comprising a source of alternating current, an alternating current dynamo-electric machine provided with a plurality of armature phase windings and a field winding, an electric valve frequency changing system connected between said source of current and said machine for supplying variable frequency current to said machine, a switching device connected between the terminals of said armature phase windings and said field winding to provide a unidirectional flow of current through said field winding, and means responsive to the speed of said machine for controlling the frequency of the current supplied by said electric valve frequency changing system.

6. An electric valve frequency changing system comprising an alternating current supply circuit, a polyphase load circuit, an inductive winding for each conductor of each of said circuits, each inductive winding being connected at an intermediate point thereon to a different conductor of its associated circuit, a plurality of controlled electric valves interconnecting the terminals of the inductive windings of said circuits, an electric motor connected to said polyphase circuit, a circuit for controlling the conductivities of said valves, and means responsive to the speed of said motor for controlling the frequency at which said valves are rendered conductive.

7. An electric valve frequency changing system comprising an alternating current supply circuit, a polyphase load circuit, an inductive winding for each conductor of each of said circuits, each inductive winding being connected at an intermediate point thereon to a different conductor of its associated circuit, a plurality of controlled electric valves interconnecting the terminals of the inductive windings of said polyphase circuit with the terminals of the inductive windings of said alternating current supply circuit, an electric motor having a plurality of phase windings connected to said polyphase circuit, a field winding for said motor, switching means interconnecting the remaining terminals of said phase windings with said field winding so as to provide a unidirectional current path through said field winding, a circuit for controlling the conductivities of said valves, and means responsive to the speed of said motor for controlling the frequency of said conductivities.

8. The combination comprising a source of alternating current, a polyphase alternating current motor provided with a single group of armature phase windings and a field winding, asymmetrical conducting means connecting said field winding between said armature windings so as to provide a unidirectional flow of current through said field winding, an electric valve frequency changing system interconnecting said armature phase winding with said source of current, and means responsive to the speed of said motor for controlling the frequency of the alternating current supplied by said electric valve frequency changing system.

9. The combination comprising a source of single phase alternating current, a polyphase alternating current motor having a plurality of armature phase windings and a field winding, switching means interconnecting said field winding and said armature phase windings so as to provide a unidirectional flow of current through said field winding, an electric valve frequency system interconnecting said alternating current motor and said alternating current source, a control circuit for determining the frequency of the current supplied by said frequency changing system, and means controlled by said motor for determining the frequency at which said control circuit operates.

10. The combination comprising a source of variable frequency alternating current, a polyphase alternating current motor provided with a single group of armature phase windings and a field winding, means for transmitting alternating current from said source through said armature phase windings, means interconnecting said armature phase windings and said field winding to provide a unidirectional flow of current through said field winding, and means responsive to the speed of said motor for controlling the frequency of the alternating current supplied to said motor.

11. The combination comprising a source of alternating current, an alternating current dynamo-electric machine provided with a plurality of armature phase windings and a field winding, a switching device connected between the terminals of said armature phase windings and said field winding to provide a unidirectional flow of current through said field winding, a plurality of variable reactors connected to the same terminals of said armature phase windings to which said switching device is connected, an electric valve frequency changing system interconnecting the remaining terminals of said armature phase windings and said alternating current source, and means responsive to the speed of said motor for controlling the frequency of the current supplied by said electric valve frequency changing system.

12. The combination comprising a source of variable frequency alternating current, a polyphase alternating current motor provided with a single group of armature phase windings and a field winding, means for conducting current from one of said armature windings through said field winding to another of said armature windings in such manner as to provide a unidirectional flow of current through said field winding, means responsive to the speed of said motor for controlling the frequency of the alternating current supplied thereto, and an adjustable impedance device connected across said field winding for varying the current flowing therethrough.

13. The combination comprising a source of alternating current variable in frequency, an alternating current dynamo-electric machine connected thereto, said machine being provided with a field winding and a plurality of armature phase windings each having a free terminal and a neutral terminal, means connecting said free terminals to said source of alternating current, and asymmetrically conductive means interconnecting the terminals of said field winding with the neutral terminals of said armature phase winding.

14. The combination comprising a source of alternating current variable in frequency, an alternating current dynamo-electric machine connected thereto, said machine being provided with a single group of armature phase windings and a field winding, means for transmitting alternating current from said source through each of said armature phase windings, means connected directly between said armature phase windings and said field winding to provide a unidirectional flow of current through said field winding, and means operated in response to the speed of said motor for determining the frequency of the alternating current supplied thereto.

WILLIAM A. DODGE,
*Administrator of the Estate of Camil A. Sabbah, Deceased.*